(12) United States Patent
Tang et al.

(10) Patent No.: US 10,677,336 B2
(45) Date of Patent: Jun. 9, 2020

(54) CONTINUOUSLY VARIABLE TRANSMISSION

(71) Applicant: WEIHAI TUANZHONG TRANSMISSION CO., LTD., Weihai (CN)

(72) Inventors: Yongfeng Tang, Weihai (CN); Yuning Tang, Weihai (CN)

(73) Assignee: WEIHAI TUANZHONG TRANSMISSION CO., LTD., Weihai, Shandong Province (CN)

( * ) Notice: Subject to any disclaimer, the term of this patent is extended or adjusted under 35 U.S.C. 154(b) by 0 days.

(21) Appl. No.: 16/349,930

(22) PCT Filed: Dec. 15, 2017

(86) PCT No.: PCT/CN2017/116593
§ 371 (c)(1),
(2) Date: May 14, 2019

(87) PCT Pub. No.: WO2018/137437
PCT Pub. Date: Aug. 2, 2018

(65) Prior Publication Data
US 2019/0338841 A1 Nov. 7, 2019

(30) Foreign Application Priority Data
Jan. 25, 2017 (CN) .......................... 2017 1 0055648

(51) Int. Cl.
*F16H 47/12* (2006.01)
*F16H 47/08* (2006.01)

(52) U.S. Cl.
CPC ............. *F16H 47/12* (2013.01); *F16H 47/08* (2013.01); *F16H 2702/00* (2013.01); *F16H 2702/02* (2013.01)

(58) Field of Classification Search
CPC ...... F16H 47/08; F16H 47/12; F16H 2702/00; F16H 2702/02
(Continued)

(56) References Cited

U.S. PATENT DOCUMENTS 1,933,143 A * 10/1933 Janssen .................... F16H 33/16
475/112
3,334,529 A * 8/1967 Cancrinus ............... F16H 47/12
475/111

FOREIGN PATENT DOCUMENTS

DE 1295950 B * 5/1969 ............. F16H 47/12
GB 949175 A * 2/1964 ............. F16H 47/12

* cited by examiner

*Primary Examiner* — Leslie A Nicholson, III
(74) *Attorney, Agent, or Firm* — Platinum Intellectual Property LLP

(57) ABSTRACT

A continuously variable transmission is provided, solving the technical problems in which a balancing force between a torque-changing bucket wheel and a fluid of a hydraulic two-speed synchronizer is limited, discharging all of the fluid to increase torque results in the loss of flexible transmission, and the structures of control and braking apparatuses are complex. The continuously variable transmission comprises an input end planetary gear set (101) and an output end planetary gear set (102). A cavity planetary gear carrier (104) is disposed between the input end planetary gear set (101) and the output end planetary gear set (102). The cavity planetary gear carrier (104) comprises a cavity input end cover (6) and a cavity output end cover (13). A bucket wheel cavity housing (14) is fixedly disposed between the cavity input end cover (6) and the cavity output end cover (13). An inner side of the input end planetary gear set (101) is connected to the cavity input end cover (6). An inner side of the output end planetary gear set (102) is connected to the cavity output end cover (13). One side (Continued)

inside the bucket wheel cavity housing (14) is provided with a bucket wheel planetary gear set (103). The continuously variable transmission of the invention is widely applicable in the field of transmissions.

10 Claims, 9 Drawing Sheets

(58) Field of Classification Search
USPC .......................................................... 475/59
See application file for complete search history.

CONTINUOUSLY VARIABLE TRANSMISSION

BACKGROUND OF THE INVENTION

Related Applications

This application is a United States National Stage Application filed under 35 U.S.C 371 of PCT Patent Application Serial No. PCT/CN2017/116593, filed Dec. 15, 2017, which claims Chinese Patent Application Serial No. CN 201710055648.2, filed Jan. 25, 2017, the disclosure of all of which are hereby incorporated by reference in their entirety.

Field of the Invention

The present invention relates to a mechanical transmission device and more particularly, to a flexibly activated continuously variable transmission.

Description of the Related Art

In the field of transmission, transmissions are applied most widely in the automobile field. At present, automotive transmissions are classified according to manipulation manner into: manual transmission (MT), automatic transmission (AT) and manual automatic integrated transmission. With the rapid development of automobiles from day to day, the automatic transmission has gradually occupied a mainstream of the automobile due to its simple manipulation, and the automatic transmission automobile achieves the purpose of shifting by means of hydraulic transmission and gear combination.

Automatic transmissions are further classified into hydraulic automatic transmission (AT), electronically controlled mechanical automatic transmission (AMT) and continuously variable transmission (CVT). Among them, the most widely applied and most loaded component is hydraulic torque converter. However, the existing transmissions universally have the following problems.

(1) The existing manual transmission (MT) performs shifting mainly by adjusting different gear combinations; the existing electronically controlled mechanical automatic transmission (AMT) is additionally installed an electronic control system on the basis of the conventional dry clutches and manual gear transmissions and modifies the manual shifting mechanism into an automatic shifting mechanism so as to realize a stepped mechanical automatic transmission which is shifted automatically, and the disadvantage thereof is that: flexible transmission can not be provided, continuously variable transmission can not be realized, and control structure is complicated.

(2) The existing hydraulic transmission includes a hydraulic torque converter and a transmission that increases a control on the basis of the hydraulic torque converter, such as a hydraulic automatic transmission (AT). In the hydraulic torque converter, a pump wheel of which the power is associated through a housing agitates a fluid in the torque converter and drives, through a guide wheel, a turbine to rotate, and then the turbine outputs the power. The disadvantage thereof is that: when a difference between rotation speeds of the pump wheel and the turbine of the hydraulic torque converter is close to synchronization, transmission capacity will be lost and synchronization can not be achieved; however, when a control system is added to overcome the above existed problems of the hydraulic torque converter, it further causes problems of complicated system and high manufacturing cost.

(3) The existing continuously variable transmission (CVT) transmits power by using a transmission belt in which a driving wheel and a driven wheel that have variable transmission friction forces and working diameters cooperate with each other, and may achieve a continuously change of transmission ratio, thereby obtaining the best match of power train and engine working conditions. The disadvantage thereof is that: flexibly activation with zero can not be provided, a large torque can not be provided, and it tends to slip when force changes frequently.

(4) Chinese Patent No. 102606709B discloses a hydraulic double-speed synchronizer. When the hydraulic double-speed synchronizer operates, a driving apparatus drives an input shaft 7 to drive an inner casing 2 to rotate, and at the same time, supplies a working fluid stored in an outer casing 1 to the inner casing 2 using a working pump. When the inner casing 2 just starts to rotate, a large ring gear 14 fixedly connected to an output shaft 8 is not rotated due to the load on the output shaft 8, but a planetary gear 11, a reverse wheel 12, a bucket wheel shaft 10 and a bucket wheel 9 revolve around the output shaft 8 following an inner casing bracket 19; at the same time, the bucket wheel 9 rotates around the bucket wheel shaft 10 with a high speed. As the inner casing 2 continues to rotate, the fluid contained in the inner casing 2 forms an annular fluid surface in the inner casing 2 due to the effect of centrifugal force. When the level of the fluid reaches a predetermined height, the fluid enters into each concave-shaped bucket wheel blade 22 of the bucket wheel. The fluid entering into the bucket wheel blade 22 forces the rotation speed of the bucket wheel 9 to gradually decrease due to the centrifugal force until the rotation stops. During this procedure, the rotation speed of the output shaft 8 gradually increases, and finally the input shaft 7, the inner casing 2, the planetary gear 11, the bucket wheel 9, the reverse wheel 12, the large ring gear 14 and the output shaft 8 are all rotated at the same speed to achieve a soft activation of the load. As can be seen from the above, the magnitude of the centrifugal force is dependent on the level of the fluid kept close to the inner surface of the inner casing 2, and further determines whether the output shaft 8 may rotate in synchronization with the input shaft 7. The more the output shaft 8 tends to rotate in synchronization with the input shaft 7, the smaller the slip between the output shaft 8 and the input shaft 7 is. As shown in FIG. 7, during the operation of the hydraulic double-speed synchronizer, when a current on a motor measured by a current transformer 604 reaches a set value, for example, is greater than or equal to 120 A (step 701), and a temperature of the fluid in the outer casing 1 or the inner casing 2 measured by a Pt100 platinum thermal resistance 602 reaches a set value, for example, is greater than or equal to 70° C. (step 703), a signal is transmitted to a single chip microcomputer 601. The single chip microcomputer 601 further controls the brake wheel 16 by the electromagnetic brake 15 (step 702), and the brake wheel 16 starts to engage with the sun gear 13, thereby performing braking on the sun gear 13. The sun gear 13 further transfers the braking force to the reversing wheel 12, the planetary gear 11, and the large ring gear 14 sequentially, and finally, to the output shaft 8 so as to decrease the rotation speed of the output shaft for increasing the torque. At the same time, the single chip microcomputer 601 transmits a signal to the electromagnetic valve 609, and the electromagnetic valve 609 is opened and the fluid in the inner casing is discharged by fixing a scoop 18 with a fluid discharge line 17, thereby the power loss is reduced. After the electromagnetic brake 15 is braked, the entire set of the gear mechanism participating in braking is actually a conventional structure of a planetary gear reducer.

The disadvantage of the hydraulic double-speed synchronizer is that: the balance force between the bucket wheel and the fluid is limited, and the torque may only be changed within the maximum balance force of the fluid to the bucket wheel; the fluid in the inner casing needs to be discharged when the output shaft needs to provide a torque larger than the torque that the maximum balance force of the fluid to the bucket wheel can provide, and the gear mechanism participating in braking is a conventional structure of a planetary gear reducer which does not have a flexible transmission function; and the entire control system belongs to a electronic control system, and the structure of the apparatuses of control, braking and the like are complicated.

SUMMARY OF THE INVENTION

The present invention is to solve the technical problems of the existing manual transmission (MT) that: the flexible transmission can not be provided, and the control is complicated; the hydraulic transmission loses transmission capacity when synchronizing, and the synchronizition can not be performed; the control system of the hydraulic automatic transmission is complicated and high in cost; the continuously variable transmission (CVT) can not provide flexibly activation with zero, can not provide a large torque, and tends to slip when force changes frequently; the balance force between the bucket wheel and the fluid of the hydraulic double-speed synchronizer is limited, and the torque may only be changed within the maximum balance force of the fluid to the bucket wheel; the fluid in the inner casing needs to be discharged when the output shaft needs to provide a torque larger than the torque that the maximum balance force of the fluid to the bucket wheel can provide, and the gear mechanism participating in braking is a conventional structure of a planetary gear reducer which does not have a flexible transmission function; and the entire control system belongs to a electronic control system, and the structure of the apparatuses of control, braking and the like are complicated. A continuously variable transmission is provided which may not only change the torque within the maximum balance force of the fluid to the bucket wheel, but also not need to discharge the fluid in the inner casing when the output shaft needs to provide a torque larger than the torque that the maximum balance force of the fluid to the bucket wheel can provide, and which may achieve continuous transmission and wide range of torque change without the gear mechanism participating in the braking and has a flexible transmission function with a simple structure and without adding control system.

To this end, the technical solution of the present invention is a continuously variable transmission including an input end planetary gear set and an output end planetary gear set, a cavity planetary gear carrier is disposed between the input end planetary gear set and the output end planetary gear set, the cavity planetary gear carrier includes a cavity input end cover and a cavity output end cover, a bucket wheel cavity housing is fixedly disposed between the cavity input end cover and the cavity output end cover, an inward side of the input end planetary gear set is connected to the cavity input end cover, an inward side of the output end planetary gear set is connected to the cavity output end cover, and one side of inside of the bucket wheel cavity housing is provided with a bucket wheel planetary gear set.

The input end planetary gear set includes an input end sun gear and input end planetary gears, an input shaft is disposed in middle of the input end sun gear, the input end sun gear is engaged with the input end planetary gears, planetary gear connecting shafts are disposed in middle of the input end planetary gears, the planetary gear connecting shafts pass through the cavity input end cover and are rotatably coupled to the cavity input end cover, the input shaft passes through the cavity input end cover and is rotatably coupled to the cavity input end cover; the planetary gear connecting shafts pass through the cavity output end cover and are rotatably coupled to the cavity output end cover.

The output end planetary gear set includes an output end sun gear and output end planetary gears, an output shaft is disposed in middle of the output end sun gear, the output end sun gear is engaged with the output end planetary gears, the output end planetary gears are fixedly connected to the planetary gear connecting shafts that pass through the cavity output end cover; the output shaft passes through the cavity output end cover and enters into the inside of the bucket wheel cavity housing, and the output shaft is rotatably coupled to the cavity output end cover.

The bucket wheel planetary gear set includes a bucket wheel sun gear and bucket wheel planetary gears, the bucket wheel sun gear is engaged with the bucket wheel planetary gears, the bucket wheel sun gear is fixedly connected to the output shaft that enters into the inside of the bucket wheel cavity housing; bucket wheel planetary gear shafts are disposed in middle of the bucket wheel planetary gears, one end of each of the bucket wheel planetary gear shafts is disposed on the cavity output end cover, and the other end of the bucket wheel planetary gear shaft is provided with a bucket wheel.

Preferably, the other side of the inside of the bucket wheel cavity housing is provided with a bushing, one side of the input shaft that passes through the cavity input end cover is rotatably coupled to the bushing, and the bucket wheel planetary gear shaft passes through the bushing and is rotatably coupled to the bushing.

Preferably, a number of the input end planetary gears of the input end planetary gear set is three or more.

Preferably, a number of the output end planetary gears of the output end planetary gear set is three or more.

Preferably, a number of the bucket wheel planetary gears of the bucket wheel planetary gear set is three or more.

Preferably, a portion of the input shaft in the inside of the bucket wheel cavity housing is provided with a bucket wheel.

A continuously variable transmission includes an input end planetary gear set and a bucket wheel planetary gear set, a cavity planetary gear carrier is disposed on an inward side of the input end planetary gear set, an output end planetary gear set is disposed on an inward side of the bucket wheel planetary gear set; the cavity planetary gear carrier includes a cavity input end cover and a cavity output end cover, a bucket wheel cavity housing is fixedly disposed between the cavity input end cover and the cavity output end cover.

The input end planetary gear set includes an input end sun gear and input end planetary gears, an input shaft is disposed in middle of the input end sun gear, the input end sun gear is engaged with the input end planetary gears, planetary gear connecting shafts are disposed in middle of the input end planetary gears, the planetary gear connecting shafts pass through the cavity input end cover and the bucket wheel cavity housing and are rotatably coupled to the cavity input end cover and the bucket wheel cavity housing.

The bucket wheel planetary gear set includes a bucket wheel sun gear and bucket wheel planetary gears, the bucket wheel sun gear is engaged with the bucket wheel planetary gears, an output shaft is disposed in middle of the bucket wheel sun gear, the output shaft passes through the cavity output end cover and is rotatably coupled to the cavity output end cover, bucket wheel planetary gear shafts are disposed in middle of the bucket wheel planetary gears, the bucket wheel planetary gear shafts pass through the cavity output end cover and the bucket wheel cavity housing and are rotatably coupled to the cavity output end cover and the bucket wheel cavity housing, and a portion of each of the bucket wheel planetary gear shafts in inside of the bucket wheel cavity housing is provided with a bucket wheel.

The output end planetary gear set includes an output end sun gear and output end planetary gears, the output end sun gear is engaged with the output end planetary gears, the output end planetary gears are fixedly connected to the planetary gear connecting shafts that pass through the cavity input end cover and the bucket wheel cavity housing, and the output end sun gear is fixedly connected to the output shaft that passes through the cavity output end cover.

Preferably, a number of the input end planetary gears of the input end planetary gear set is three or more.

Preferably, a number of the output end planetary gears of the output end planetary gear set is three or more.

Preferably, a number of the bucket wheel planetary gears of the bucket wheel planetary gear set is three or more.

The present invention has the effects that: since the continuously variable transmission includes an input end planetary gear set and an output end planetary gear set, a cavity planetary gear carrier is disposed between the input end planetary gear set and the output end planetary gear set, the cavity planetary gear carrier includes a cavity input end cover and a cavity output end cover, a bucket wheel cavity housing is fixedly disposed between the cavity input end cover and the cavity output end cover, an inward side of the input end planetary gear set is connected to the cavity input end cover, an inward side of the output end planetary gear set is connected to the cavity output end cover, and one side of inside of the bucket wheel cavity housing is provided with a bucket wheel planetary gear set, it is possible to realize an activation with a speed of zero and no external resistance activation when being activated, and the transmission procedure is flexible; it is possible to realize a setting of increasing torque in multiples, the range of torque change is wide, and the rated working condition is synchronized; it is possible to realize a wide range of automatic matching of torque and speed through a self-adaptive adjustment without a control apparatus; and it is possible to be applicable in a situation of a high-power flexible transmission.

SYMBOLS IN THE DRAWINGS

101 input end planetary gear set; 102 output end planetary gear set; 103 bucket wheel planetary gear set; 104 cavity planetary gear carrier; 1 input shaft; 2 input end sun gear; 3 input end planetary gear; 4 planetary gear connecting shaft; 5 bearing; 6 cavity input end cover; 7 bucket wheel; 8 bucket wheel planetary gear; 9 bucket wheel sun gear; 10 output end sun gear; 11 output shaft; 12 bushing; 13 cavity output end cover; 14 bucket wheel cavity housing; 15 output end planetary gear; 16 bucket wheel cavity internal fluid; 17 bucket wheel planetary gear shaft.

DESCRIPTION OF THE EMBODIMENTS

The present invention will be further described below in conjunction with the embodiments.

Embodiment 1

Figure 1:
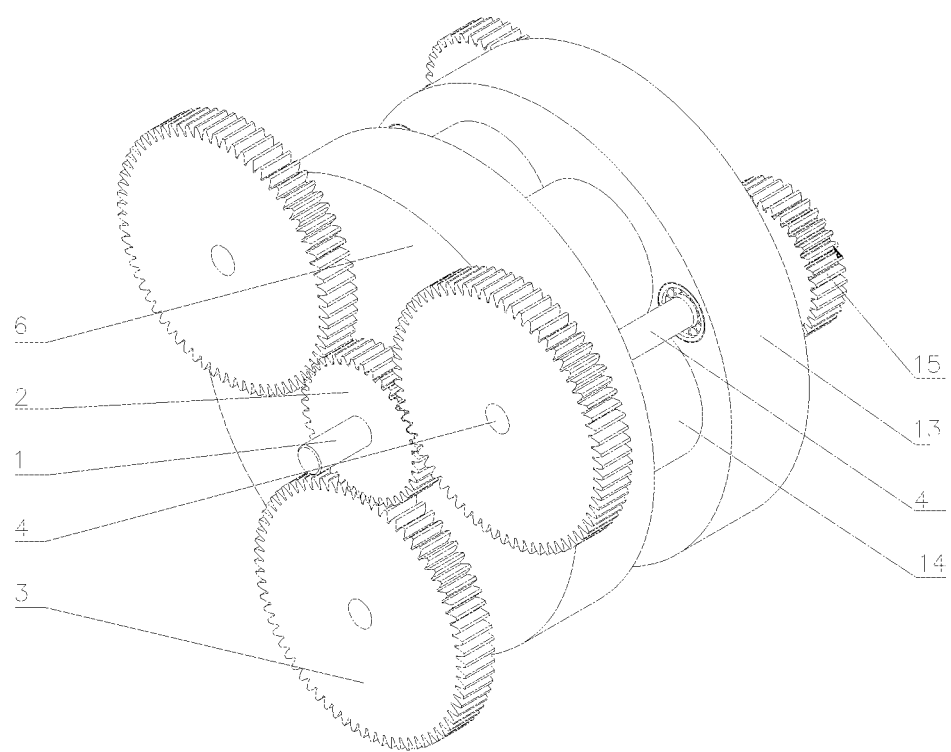
FIG. 1 is an axonometric view of Embodiment 1 of the present invention.
Figure 2:
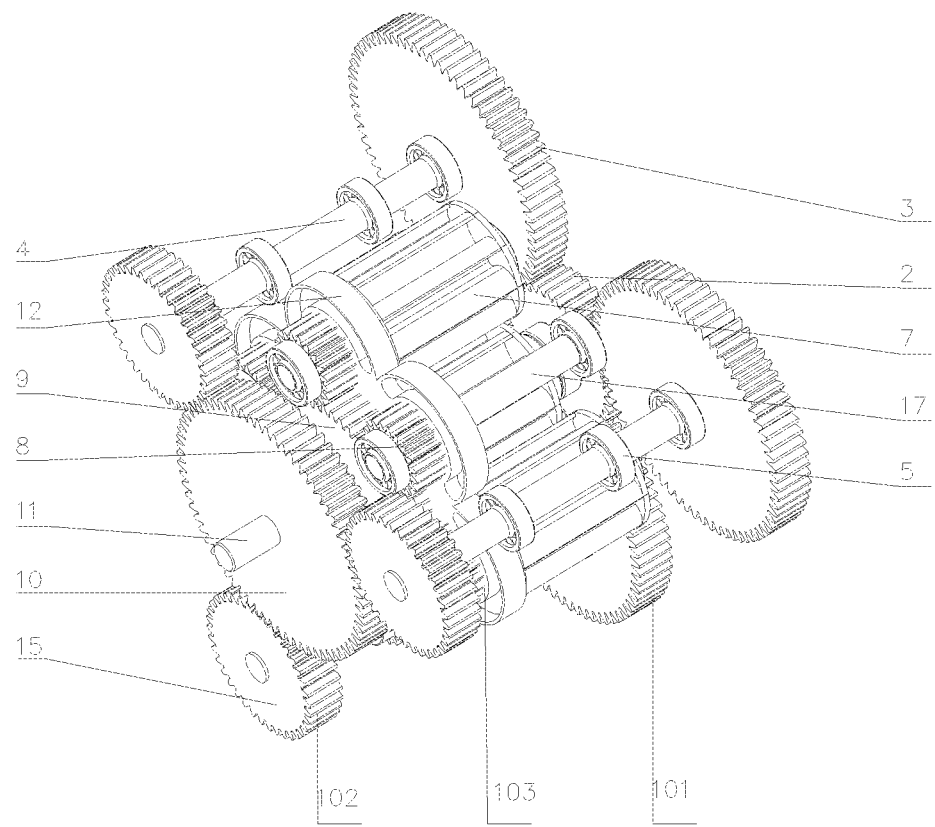
FIG. 2 is another axonometric view of Embodiment 1 of the present invention.
Figure 3:
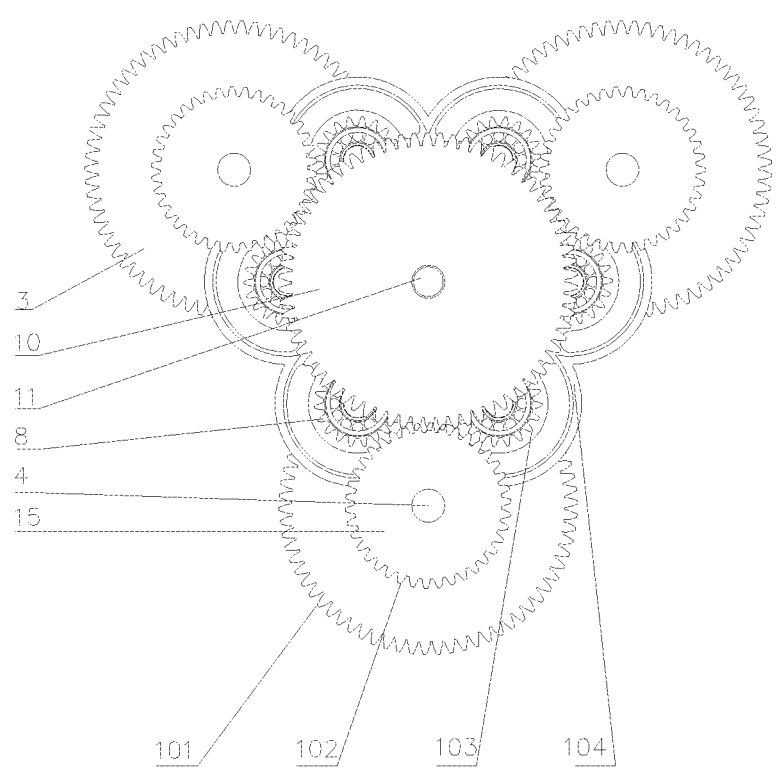
FIG. 3 is a front view of Embodiment 1 of the present invention.
Figure 4:
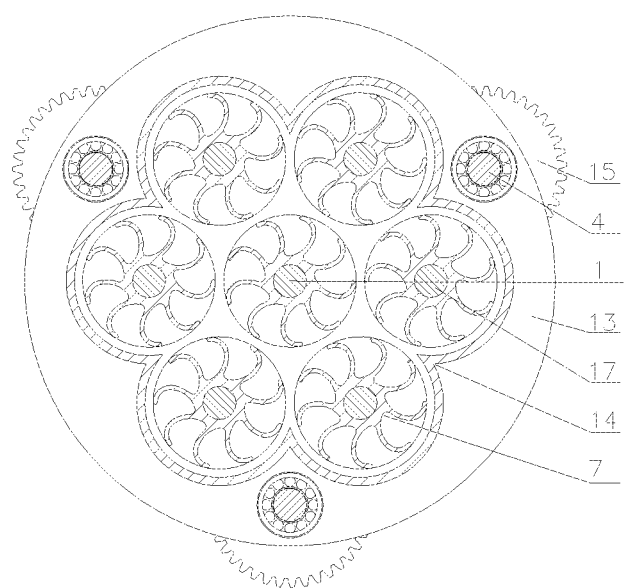
FIG. 4 is a rear view of Embodiment 1 of the present invention.
Figure 5:
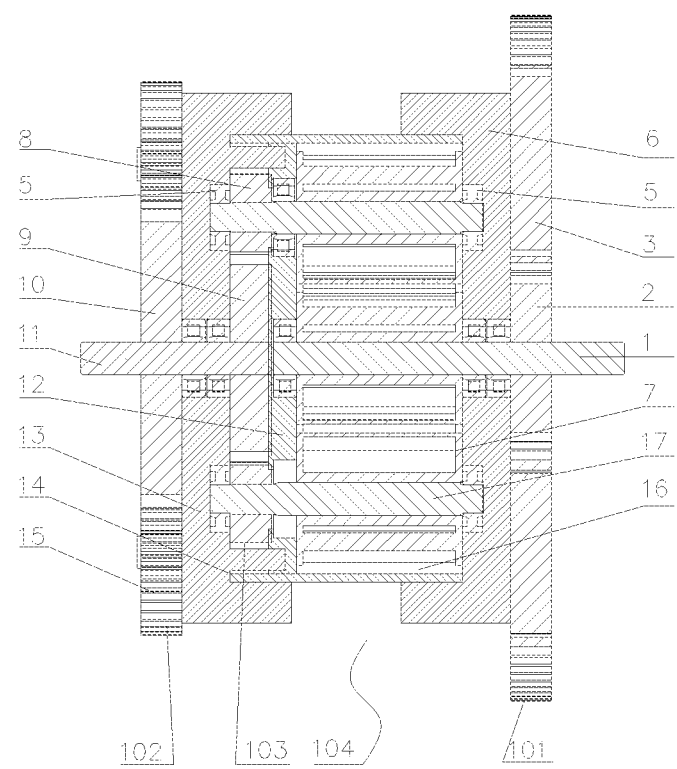
FIG. 5 is a side view of Embodiment 1 of the present invention.

FIG. 1 to FIG. 5 show a continuously variable transmission of an embodiment of the present invention, which is provided with an input end planetary gear set 101 and an output end planetary gear set 102. A cavity planetary gear carrier 104 is disposed between the input end planetary gear set 101 and the output end planetary gear set 102. The cavity planetary gear carrier 104 includes a cavity input end cover 6 and a cavity output end cover 13. A bucket wheel cavity housing 14 is fixedly disposed between the cavity input end cover 6 and the cavity output end cover 13. An inward side of the input end planetary gear set 101 is connected to the cavity input end cover 6. An inward side of the output end planetary gear set 102 is connected to the cavity output end cover 13. One side of inside of the bucket wheel cavity housing 14 is provided with a bucket wheel planetary gear set 103. The input end planetary gear set 101 includes one input end sun gear 2 and three input end planetary gears 3. An input shaft 1 is disposed in middle of the input end sun gear 2. The input end sun gear 2 is engaged with the input end planetary gears 3. Planetary gear connecting shafts 4 are disposed in middle of the input end planetary gears 3. The planetary gear connecting shafts 4 pass through the cavity input end cover 6 and are rotatably coupled to the cavity input end cover 6. The input shaft 1 passes through the cavity input end cover 6 and is rotatably coupled to the cavity input end cover 6. The planetary gear connecting shafts 4 pass through the cavity output end cover 6 and are rotatably coupled to the cavity output end cover 6. The output end planetary gear set 102 includes one output end sun gear 10 and three output end planetary gears 15. An output shaft 11 is disposed in middle of the output end sun gear 10. The output end sun gear 10 is engaged with the output end planetary gears 15. The output end planetary gears 15 are fixedly connected to the planetary gear connecting shafts 4 that pass through the cavity output end cover 13. The output shaft 11 passes through the cavity output end cover 13 and enters into the inside of the bucket wheel cavity housing 14. The output shaft 11 is rotatably coupled to the cavity output end cover 13. The bucket wheel planetary gear set 103 includes one bucket wheel sun gear 9 and six bucket wheel planetary gears 8. The bucket wheel sun gear 9 is engaged with the bucket wheel planetary gears 8. The bucket wheel sun gear 9 is fixedly connected to the output shaft 11 that enters into the inside of the bucket wheel cavity housing 14. Bucket wheel planetary gear shafts 17 are disposed in middle of the bucket wheel planetary gears 8. One end of each of the bucket wheel planetary gear shafts 17 is disposed on the cavity output end cover 13 and is rotatably coupled thereto, and the other end of the bucket wheel planetary gear shaft 17 is disposed on the cavity input end cover 6 and is rotatably coupled thereto. A portion of the bucket wheel planetary gear shaft 17 in the inside of the bucket wheel cavity housing 14 is provided with a bucket wheel 7. The other side of the inside of the bucket wheel cavity housing 14 is provided with a bushing 12. One side of the input shaft 1 that passes through the cavity input end cover 6 is rotatably coupled to the bushing 12. The bucket wheel planetary gear shaft 17 passes through the bushing 12 and is rotatably coupled to the bushing 12. An appropriate amount of bucket wheel cavity internal fluid 16 is filled between the bushing 12 and the cavity input end cover 6. A portion of the input shaft 1 in the inside of the bucket wheel cavity housing 14 is provided with a bucket wheel 7.

The bucket wheel planetary gear 8 and the bucket wheel 7 may be formed as an integral structure, and the other end of the bucket wheel 7 may adopt a cantilever structure or a support structure to adapt to various transmissions having different volume requirements.

In the present embodiment, the number of teeth of the input end sun gear 2 is 35, and the number of teeth of the input end planetary gear 3 is 70; the number of teeth of the output end planetary gear 15 is 35, and the number of teeth of the output end sun gear 10 is 70. The torque output by the output shaft 11 is in a range that is 4 times of the torque provided by the input shaft 1.

The number of teeth of the bucket wheel planetary gear 8 is 20, and the number of teeth of the bucket wheel sun gear 9 is 50. The maximum balance torque that may be provided by the bucket wheel gear set 103 to the output shaft 11 is in a range that is 2.5 times of the resistance torque subjected by the combination of the bucket wheels 7 against the bucket wheel cavity internal fluid 16.

The operation procedure is as follows. At the activation, the power is set to be input clockwise. As the power is input from the input shaft 1, the input end sun gear 2 is driven to rotate clockwise. The input end sun gear 2 drives the input end planetary gear 3 to rotate counterclockwise and drives, through the fixedly connected planetary gear connecting shaft 4, the output end planetary gear 15 to rotate, meanwhile, the output end sun gear 10 subjects a resistance from the output shaft 11. The output end planetary gear 15 revolves counterclockwise around the output end sun gear 10 and drives the cavity planetary gear carrier 104 to revolve counterclockwise, and further drives the bucket wheel planetary gear 8 to rotate counterclockwise, thereby driving the bucket wheel 7 to rotate counterclockwise. The number of counterclockwise rotation of the bucket wheel 7 exceeds the number of counterclockwise revolution of the cavity planetary gear carrier 104. The bucket wheel 7 subjects a resistance of the bucket wheel cavity internal fluid 16 in the bucket wheel cavity housing 14 due to the counterclockwise rotation so as to form a torque, in which the resistance includes the fluid gravity formed by the revolution of the bucket wheel cavity housing 14, the hydraulic power formed by the injection of the fluid leaving a bucket wheel 7 to an adjacent bucket wheel 7, and the fluid adhesion force of the fluid between the bucket wheel 7 and the bucket wheel cavity housing 14. The torque is transmitted to the output shaft 11, to which the bucket wheel sun gear 9 is fixedly connected, in multiples by means of the diameter change of the bucket wheel planetary gear 8 and the bucket wheel sun gear 9, and the bucket wheel sun gear 9 subjects a resistance from the output shaft 11 and is not driven. According to Newton's Third Law, this torque is converted into a torque that prevents the cavity planetary gear carrier 104 from revolving counterclockwise, and further drives the output end planetary gear 15 to against force from the output end sun gear 10, thereby the output end sun gear 10 drives the output shaft 11 to output power. The resistance of the bucket wheel cavity internal fluid 16 to the bucket wheel 7 is 0 at the beginning, and as the revolution speed of the cavity planetary gear carrier 104 increases, the resistance of the bucket wheel cavity internal fluid 16 to the bucket wheel 7 increases in multiples, thereby the output end sun gear 10 drives the output shaft 11 to rotate so as to output power through the output shaft 11.

During the above procedure, at the beginning of the activation, the continuously variable transmission of the present Embodiment 1 is free from the external resistance and activates with a speed of zero; in the middle of the activation, the resistance subjected by the combination of the bucket wheels 7 is uniformly increased, and finally, the output end planetary gear 15 drives, through the output end sun gear 10, the output shaft 11 to flexibly activate; in the rated working condition, the speed and the torque are stable with respect to each other, and since the forces subjected by the bucket wheel 7 are balanced, the bucket wheel 7 does not rotate around itself and the wheels do not rotate with respect to each other, thereby the synchronous transmission of power is realized as a whole, approaching a transmission having a ratio 1:1; the torque is automatically adjusted to be balanced with the speed when the forces are unbalanced, and the torque output by the output shaft 11 of the continuously variable transmission of the present Embodiment 1 is 4 times of the maximum torque provided by the input shaft 1.

The number of teeth of the input end sun gear 2 and the number of teeth of the input end planetary gear 3 as well as the transmission ratio of other transmission pairs may be modified according to the needs of different application fields, so as to optimally adjust the amount of the required torque and achieve the output of various speeds and torques.

Embodiment 2

Figure 6:
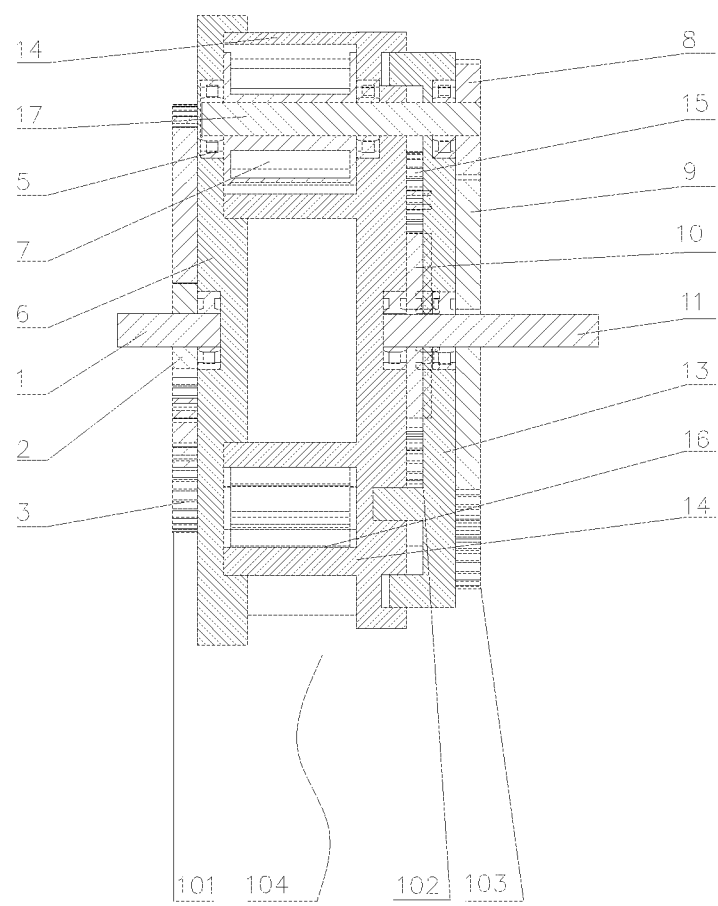
FIG. 6 is a schematic view of Embodiment 2 of the present invention.
Figure 7:
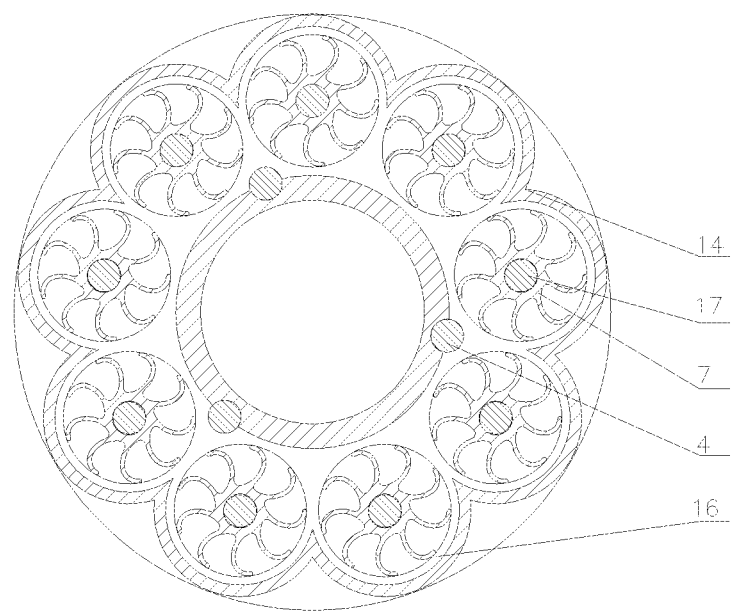
FIG. 7 is a front view of Embodiment 2 of the present invention.
Figure 8:
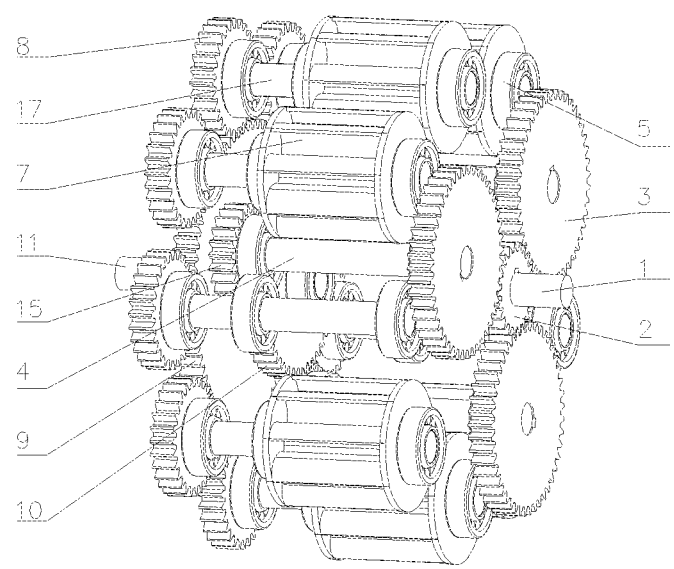
FIG. 8 is an axonometric view of Embodiment 2 of the present invention.
Figure 9:
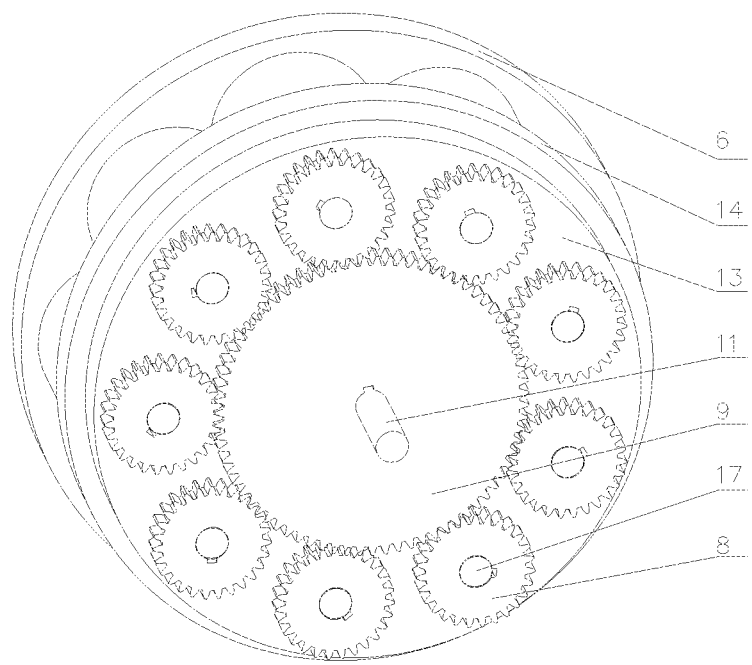
FIG. 9 is another axonometric view of Embodiment 2 of the present invention.

FIG. 6 to FIG. 9 show a continuously variable transmission of Embodiment 2 of the present invention, which is provided with an input end planetary gear set 101 and a bucket wheel planetary gear set 103. A cavity planetary gear carrier 104 is disposed on an inward side of the input end planetary gear set 101. The cavity planetary gear carrier 104 includes a cavity input end cover 6 and a cavity output end cover 13. A bucket wheel cavity housing 14 is fixedly disposed between the cavity input end cover 6 and the cavity output end cover 13. An output end planetary gear set 102 is disposed between the cavity output end cover 13 and the bucket wheel cavity housing 14. The input end planetary gear set 101 includes one input end sun gear 2 and three input end planetary gears 3. An input shaft 1 is disposed in middle of the input end sun gear 2. The input end sun gear 2 is engaged with the input end planetary gears 3. Planetary gear connecting shafts 4 are disposed in middle of the input end planetary gears 3. The planetary gear connecting shafts 4 pass through the cavity input end cover 6 and the bucket wheel cavity housing 14 and are rotatably coupled to the cavity input end cover 6 and the bucket wheel cavity housing 14. The bucket wheel planetary gear set 103 includes one bucket wheel sun gear 9 and nine bucket wheel planetary gears 8. The bucket wheel sun gear 9 is engaged with the bucket wheel planetary gears 8. An output shaft 11 is disposed in middle of the bucket wheel sun gear 9. The output shaft 11 passes through the cavity output end cover 13 and is rotatably coupled to the cavity output end cover 13. Bucket wheel planetary gear shafts 17 are disposed in middle of the bucket wheel planetary gears 8. The bucket wheel planetary gear shafts 17 pass through the cavity output end cover 13 and the bucket wheel cavity housing 14 and are rotatably coupled to the cavity output end cover 13 and the bucket wheel cavity housing 14, and the other end of each of the bucket wheel planetary gear shafts 17 is disposed on the cavity input end cover 6 and is rotatably coupled thereto. The portions of the bucket wheel planetary gear shafts 17 in inside of the bucket wheel cavity housing 14 are fixedly provided with nine bucket wheels 7. The output end planetary gear set 102 includes one output end sun gear 10 and three output end planetary gears 15. The output end sun gear 10 is engaged with the output end planetary gears 15. The output end planetary gears 15 are fixedly connected to the planetary gear connecting shafts 4 that pass through the cavity input end cover 6 and the bucket wheel cavity housing 14. The output end sun gear 10 is fixedly connected to the output shaft 11 that passes through the cavity output end cover 13. An appropriate amount of bucket wheel cavity internal fluid 16 is filled in the bucket wheel cavity housing 14.

Embodiment 2 modifies the planetary gear connecting shaft 4 from the outside of the bucket wheel cavity housing 14 to the inside of the bucket wheel cavity housing 14 and cancels the bucket wheel 7 at the center of the bucket wheel cavity housing 14 on the basis of Embodiment 1. The results are that: the diameters of the gears in the input end planetary gear set 101 and the output end planetary gear set 102 become small, but the diameter ratio of one another is not affected; the positions of the bucket wheel planetary gear set 103 and the output end planetary gear set 102 are interchanged; the outer diameter of the bucket wheel planetary gear set 103 is increased and the number of the bucket wheels 7 is increased, so that the centrifugal acceleration of the bucket wheel cavity internal fluid 16 is increased, and the fluid gravity, the fluid adhesion force and the hydraulic power thus subjected by the bucket wheel 7 are increased; and the bushing 12 is incorporated with the bucket wheel cavity housing 14.

In the present Embodiment 2, the number of teeth of the input end sun gear 2 is 20, and the number of teeth of the input end planetary gear 3 is 40; the number of teeth of the output end planetary gear 15 is 20, and the number of teeth of the output end sun gear 10 is 40. The torque output by the output shaft 11 is in a range that is 4 times of the torque provided by the input shaft 1.

The number of teeth of the bucket wheel planetary gear 8 is 25, and the number of teeth of the bucket wheel sun gear 9 is 75. The maximum balance torque that may be provided by the bucket wheel gear set 103 to the output shaft 11 is in a range that is 3 times of the resistance torque subjected by the combination of the bucket wheels 7 against the bucket wheel cavity internal fluid 16.

The operation procedure is as follows. At the activation, the power is set to be input clockwise. As the power is input from the input shaft 1, the input end sun gear 2 is driven to rotate clockwise. The input end sun gear 2 drives the input end planetary gear 3 to rotate counterclockwise and drives, through the fixedly connected planetary gear connecting shaft 4, the output end planetary gear 15 to rotate, meanwhile, the output end sun gear 10 subjects a resistance from the output shaft 11. The output end planetary gear 15 revolves counterclockwise around the output end sun gear 10 and drives the cavity planetary gear carrier 104 to revolve counterclockwise, and further drives the bucket wheel planetary gear 8 to rotate counterclockwise, thereby driving the bucket wheel 7 to rotate counterclockwise. The number of counterclockwise rotation of the bucket wheel 7 exceeds the number of counterclockwise revolution of the cavity planetary gear carrier 104. The bucket wheel 7 subjects a resistance of the bucket wheel cavity internal fluid 16 in the bucket wheel cavity housing 14 due to the counterclockwise rotation so as to form a torque, in which the resistance includes the fluid gravity formed by the revolution of the bucket wheel cavity housing 14, the hydraulic power formed by the injection of the fluid leaving a bucket wheel 7 to an adjacent bucket wheel 7, and the fluid adhesion force of the fluid between the bucket wheel 7 and the bucket wheel cavity housing 14. The torque is transmitted to the output shaft 11, to which the bucket wheel sun gear 9 is fixedly connected, in multiples by means of the diameter change of the bucket wheel planetary gear 8 and the bucket wheel sun gear 9, and the bucket wheel sun gear 9 subjects a resistance from the output shaft 11 and is not driven. According to Newton's Third Law, this torque is converted into a torque that prevents the cavity planetary gear carrier 104 from revolving counterclockwise, and further drives the output end planetary gear 15 to against force from the output end sun gear 10, thereby the output end sun gear 10 drives the output shaft 11 to against force. The resistance of the bucket wheel cavity internal fluid 16 to the bucket wheel 7 is 0 at the beginning, and as the revolution speed of the cavity planetary gear carrier 104 increases, the resistance of the bucket wheel cavity internal fluid 16 to the bucket wheel 7 increases in multiples, thereby the output end sun gear 10 drives the output shaft 11 to rotate so as to output power through the output shaft 11.

During the above procedure, at the beginning of the activation, the continuously variable transmission of the present Embodiment 2 is free from the external resistance and activates with a speed of zero; in the middle of the activation, the resistance subjected by the combination of the bucket wheels 7 is uniformly increased, and finally, the output end planetary gear 15 drives, through the output end sun gear 10, the output shaft 11 to flexibly activate; in the rated working condition, the speed and the torque are stable with respect to each other, and since the forces subjected by the bucket wheel 7 are balanced, the bucket wheel 7 does not rotate around itself and the wheels do not rotate with respect to each other, thereby the synchronous transmission of power is realized as a whole, approaching a transmission having a ratio 1:1; the torque is automatically adjusted to be balanced with the speed when the forces are unbalanced, and the torque output by the output shaft 11 of the continuously variable transmission of the present Embodiment 2 is 4 times of the torque provided by the input shaft 1.

The above is only the specific embodiments of the present invention, and the scope of the present invention is not limited thereto, and thus all of the replacement of the equivalent components thereof, or the equivalent changes and modifications made according to the claimed scope of the present invention should still fall within the scope encompassed by the claims of the present invention.

What is claimed is:

1. A continuously variable transmission, comprising an input end planetary gear set and an output end planetary gear set, wherein a cavity planetary gear carrier is disposed between the input end planetary gear set and the output end planetary gear set, the cavity planetary gear carrier includes a cavity input end cover and a cavity output end cover, a bucket wheel cavity housing is fixedly disposed between the cavity input end cover and the cavity output end cover, an inward side of the input end planetary gear set is connected to the cavity input end cover, an inward side of the output end planetary gear set is connected to the cavity output end cover, and one side of inside of the bucket wheel cavity housing is provided with a bucket wheel planetary gear set;

the input end planetary gear set includes an input end sun gear and input end planetary gears, an input shaft is disposed in middle of the input end sun gear, the input end sun gear is engaged with the input end planetary gears, planetary gear connecting shafts are disposed in middle of the input end planetary gears, the planetary gear connecting shafts pass through the cavity input end cover and are rotatably coupled to the cavity input end cover, the input shaft passes through the cavity input end cover and is rotatably coupled to the cavity input end cover; the planetary gear connecting shafts pass through the cavity output end cover and are rotatably coupled to the cavity output end cover;

the output end planetary gear set includes an output end sun gear and output end planetary gears, an output shaft is disposed in middle of the output end sun gear, the output end sun gear is engaged with the output end planetary gears, the output end planetary gears are fixedly connected to the planetary gear connecting shafts that pass through the cavity output end cover; the output shaft passes through the cavity output end cover and enters into the inside of the bucket wheel cavity housing, and the output shaft is rotatably coupled to the cavity output end cover; and the bucket wheel planetary gear set includes a bucket wheel sun gear and bucket wheel planetary gears, the bucket wheel sun gear is engaged with the bucket wheel planetary gears, the bucket wheel sun gear is fixedly connected to the output shaft that enters into the inside of the bucket wheel cavity housing; bucket wheel planetary gear shafts are disposed in middle of the bucket wheel planetary gears, one end of each of the bucket wheel planetary gear shafts is disposed on the cavity output end cover, and the other end of the bucket wheel planetary gear shaft is provided with a bucket wheel.

2. The continuously variable transmission according to claim 1, wherein a side of the inside of the bucket wheel cavity housing, which the bucket wheel planetary gear set is located, is provided with a bushing, one side of the input shaft that passes through the cavity input end cover is rotatably coupled to the bushing, and the bucket wheel planetary gear shaft passes through the bushing and is rotatably coupled to the bushing.

3. The continuously variable transmission according to claim 1, wherein a number of the input end planetary gears of the input end planetary gear set is three or more.

4. The continuously variable transmission according to claim 1, wherein a number of the output end planetary gears of the output end planetary gear set is three or more.

5. The continuously variable transmission according to claim 1, wherein a number of the bucket wheel planetary gears of the bucket wheel planetary gear set is three or more.

6. The continuously variable transmission according to claim 1, wherein a portion of the input shaft in the inside of the bucket wheel cavity housing is provided with a bucket wheel.

7. A continuously variable transmission, comprising an input end planetary gear set and a bucket wheel planetary gear set, wherein a cavity planetary gear carrier is disposed on an inward side of the input end planetary gear set, the cavity planetary gear carrier includes a cavity input end cover and a cavity output end cover, a bucket wheel cavity housing is fixedly disposed between the cavity input end cover and the cavity output end cover, an output end planetary gear set is disposed between the cavity output end cover and the bucket wheel cavity housing;

the input end planetary gear set includes an input end sun gear and input end planetary gears, an input shaft is disposed in middle of the input end sun gear, the input end sun gear is engaged with the input end planetary gears, planetary gear connecting shafts are disposed in middle of the input end planetary gears, the planetary gear connecting shafts pass through the cavity input end cover and the bucket wheel cavity housing and are rotatably coupled to the cavity input end cover and the bucket wheel cavity housing;

the bucket wheel planetary gear set includes a bucket wheel sun gear and bucket wheel planetary gears, the bucket wheel sun gear is engaged with the bucket wheel planetary gears, an output shaft is disposed in middle of the bucket wheel sun gear, the output shaft passes through the cavity output end cover and is rotatably coupled to the cavity output end cover, bucket wheel planetary gear shafts are disposed in middle of the bucket wheel planetary gears, the bucket wheel planetary gear shafts pass through the cavity output end cover and the bucket wheel cavity housing and are rotatably coupled to the cavity output end cover and the bucket wheel cavity housing, and a portion of each of the bucket wheel planetary gear shafts inside of the bucket wheel cavity housing is provided with a bucket wheel; and the output end planetary gear set includes an output end sun gear and output end planetary gears, the output end sun gear is engaged with the output end planetary gears, the output end planetary gears are fixedly connected to the planetary gear connecting shafts that pass through the cavity input end cover and the bucket wheel cavity housing, and the output end sun gear is fixedly connected to the output shaft that passes through the cavity output end cover.

8. The continuously variable transmission according to claim 7, wherein a number of the input end planetary gears of the input end planetary gear set is three or more.

9. The continuously variable transmission according to claim 7, wherein a number of the output end planetary gears of the output end planetary gear set is three or more.

10. The continuously variable transmission according to claim 7, wherein a number of the bucket wheel planetary gears of the bucket wheel planetary gear set is three or more.

* * * * *